United States Patent [19]

Yu-fang et al.

[11] Patent Number: 4,952,828
[45] Date of Patent: Aug. 28, 1990

[54] BRUSHLESS GENERATOR WITH FRONT COVER INNER-STATOR MOUNT

[75] Inventors: Ye Yu-fang; Ye Yu-jing; Ye Yu-wei; Xu Yi-xin, all of

[73] Assignee: Fujian Xianyou Electric Machine Plant, Fujian, China

[21] Appl. No.: 354,561

[22] Filed: May 22, 1989

[30] Foreign Application Priority Data

May 20, 1988 [CN] China .................... 88103087.2

[51] Int. Cl.⁵ .............. H02K 19/24; H02K 5/00; H02K 11/00
[52] U.S. Cl. .................... 310/68 D; 310/71; 310/257
[58] Field of Search ............ 310/68 D, 263, 266, 310/71, 89, 91

[56] References Cited

U.S. PATENT DOCUMENTS

| | | | |
|---|---|---|---|
| 3,215,878 | 11/1965 | Woodward, Jr. | 310/263 |
| 3,548,226 | 12/1970 | Sato | 310/68 D |
| 4,087,713 | 5/1978 | Binder | 310/263 |
| 4,286,186 | 8/1981 | Hagenlocher et al. | 310/68 D |
| 4,286,187 | 8/1981 | Binder | 310/266 |
| 4,421,998 | 12/1983 | Ahner et al. | 310/68 D |
| 4,424,464 | 1/1984 | Ikegami | 310/68 D |
| 4,591,747 | 5/1986 | Soden et al. | 310/71 |
| 4,825,112 | 4/1989 | Mineyama | 310/71 |

FOREIGN PATENT DOCUMENTS 53-93313  8/1978  Japan .................... 310/68 D

Primary Examiner—Mark O. Budd
Assistant Examiner—D. L. Rebsch
Attorney, Agent, or Firm—Sughrue, Mion, Zinn, Macpeak & Seas

[57] ABSTRACT

A brushless generator includes an inner stator mounted to the generator front cover. An internal space is thus realized between the generator rear cover and the rotor. A small heat dissipating fan is positioned between the rear cover and rotor and mounted on the rotor for rotation therewith. An exciting coil is mounted on the inner stator, the exciting coil ground terminal being directly connected to the inner stator. The other terminal of the exciting coil is connected through an insulated wire to a bolt mounting the generator designation strip which is used as an electrical conductor for electrically connecting the exciting coil to a voltage regulator mounted on the generator rear cover.

4 Claims, 2 Drawing Sheets

BRUSHLESS GENERATOR WITH FRONT COVER INNER-STATOR MOUNT

FIELD OF THE INVENTION

The invention relates to brushless generators, particularly such generators for use with cars and tractors.

BACKGROUND OF THE INVENTION

A conventional brushless generator is advantageous as its structure is simple. However, a disadvantage of the conventional generator is that the inner stator of such a generator is mounted on its rear cover. With a large current output over a long interval, the generator coil overheats. As the heat-dissipating property of the generator interior is poor, the maximum output current must be limited to prevent overheating. As a result, such generators are often unable to meet practical requirements.

Attempts have been made to improve such brushless generators. One such attempt is described in Japanese patent publication number 53-93313. Described in that patent publication is a generator with an internal fan, the generator being fitted with ventilating holes. However, the improvement provided by the ventilating holes is not very significant, as the generator's fundamental structure is not varied, and further use of an additional fan makes the generator volume large and thus undesirable.

An object of the present invention is to provide an improved brushless generator able to deliver large current over prolonged periods without overheating, the improved generator having good ventilating and heat-dissipating properties enabling it to work normally under adverse circumstances.

SUMMARY OF THE INVENTION

According to the teachings of the present invention, there is provided a brushless generator of improved construction, wherein the inner stator iron core is mounted on the generator front cover rather than the rear cover. One result of this structural change is improved compactness. Another advantage of this change is that elimination of the stator core from the rear portion of the generator provides a space between the rear cover and the rotor. This space is then available for a small, heat dissipating fan. This fan may be mounted on the rotor, for example, on the rotor's claw tooth poles, to rotate with the rotor. Owing to this improved heat dissipating capability, effected without increasing the generator volume, a compact generator with high output current capability may be realized.

According to another feature of the invention, the ground terminal of the generator exciting coil is connected to the inner stator iron core. The other coil terminal is connected to a bolt on a designation strip mounted near the front cover. As the designation strip is of electrically conductive material, it is used as a portion of an exciting coil lead. The designation strip, including its bolts, is insulated from the generator front and rear covers. Another wire is connected from a bolt on the designation strip near the rear cover to a voltage regulator.

The brushless generator of the present invention thus is compact and has improved ventilating and heat-dissipating properties. As two fans are fitted on the generator, (the original fan is outside, and the additional one inside the generator housing), the generator output current is greatly increased without overheating.

Now further description to present the invention will be made referring to drawings as following.

DETAILED DESCRIPTION OF A PREFERRED EMBODIMENT OF THE INVENTION

Figure 1:
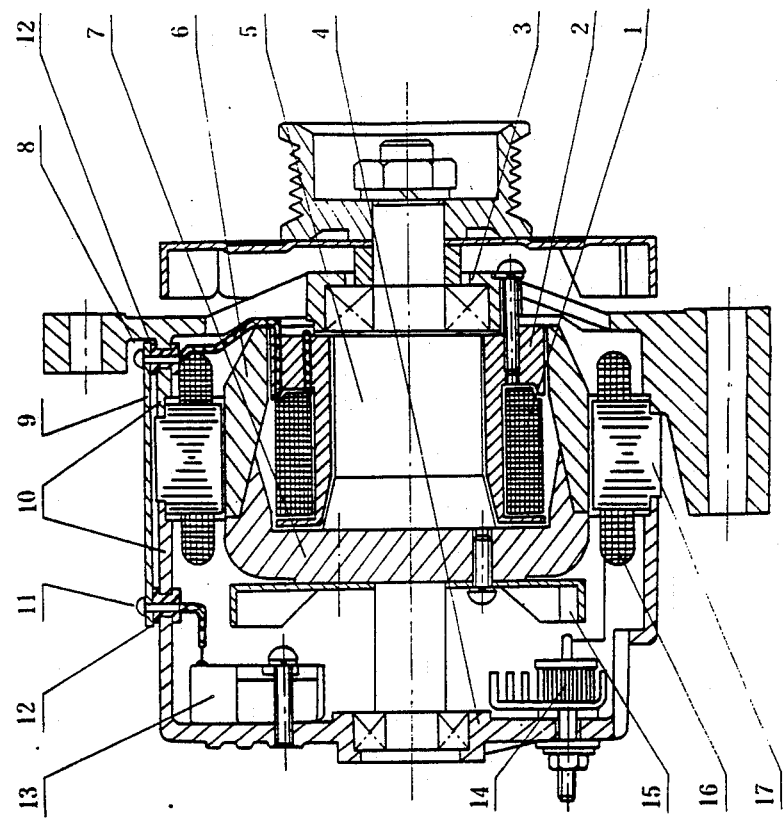
FIG. 1 illustrates the improved generator according to the teaching of this invention.

Referring to FIG. 1, the brushless generator of the invention includes an iron core inner stator 2, a front cover 3, rear cover 4, rotor spindle 5, exciting coil 1, iron core outer stator 17, and armature coil 16. Inner stator 2 is mounted on the inner wall of the front cover 3, the claw tooth poles 6 of the rotor 7 being located between the outer stator 17 and the inner stator 2.

As the inner stator 2 is mounted on the front generator cover 3, a space is available between the rear cover 4 and rotor 7. This space is used to accommodate small fan 15 which can thus be fitted inside the generator without increasing its volume. Preferably, the interior fan 15 is mounted on the bottom of the claw tooth poles 6 of rotor 7. The small fan 15 thus rotates with the rotor 7, improving heat dissipation from inside the generator. Thus, overheating during large current output will be prevented, and normal operation maintained even during large current output.

One lead terminal of exciting coil 1 of inner stator 2 is connected directly to the core of the inner stator 2. The other lead terminal is connected by an insulated lead wire to a bolt 8 on a conductive designation strip 9 located near the front cover 3 and extending toward the rear cover. Designation strip 9 thus becomes part of the current carrying lead of the exciting coil 1. The designation strip 9, as well as its two mounting bolts 8 and 11 positioned at its respective two ends, are electrically isolated from the generator housing with insulated washers 12. As a result, designation strip 9, as well as its mounting bolts 8, 11, are insulated from the peripheral faces 10 of the front and rear covers. An insulated wire extending from the bolt 11 near to rear cover 4 is connected to a terminal of voltage-regulator 13, also positioned in the interior of the generator.

Figure 2:
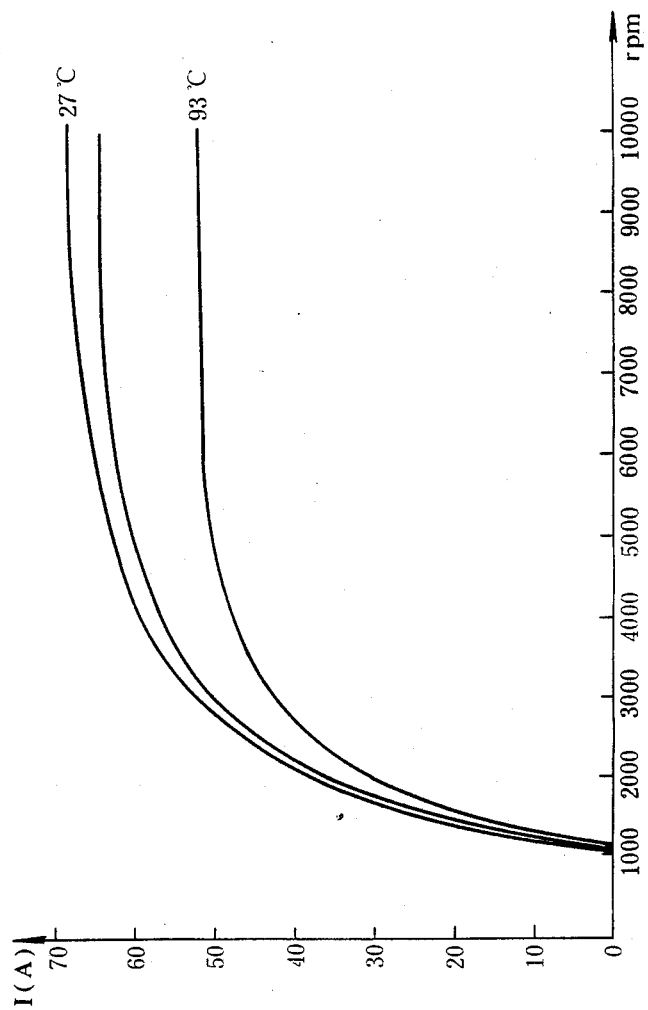
FIG. 2 shows the characteristic curves representing performance of the brushless generator of the present invention.

There has been described a novel and improved generator having particular application to cars and tractors and having a new structure providing advantages of good heat-dissipation, large power capacity, long service life, less vulnerable parts, large overload capacity, and compact structure. Performance of this improved generator is represented by the characteristic curves shown in FIG. 2.

What is claimed:

1. A brushless generator comprising: front and rear covers; an inner stator mounted to the inner wall of said front cover, an exciting coil mounted to said inner stator; and outer stator; an armature coil mounted to said outer stator; a rotor spindle; rotor poles extending from said rotor spindle into a space between said inner and outer stators; an internal fan located between said rear cover and said rotor poles and mounted on said rotor poles for rotation therewith, whereby said internal fan facilitates heat dissipation from the interior of said generator; an electrically conductive designation strip mounted to, but electrically insulated from, said front and rear covers by insulated mounting elements; a voltage regulating means mounted to said rear cover; first electrical conductor means for electrically connecting one electrical terminal of said exciting coil to said designation strip; and second electrical conductor means for electrically connecting said voltage regulator means to said designation strip, whereby said designation strip forms a portion of the electrically conductive path between said voltage regulator means mounted to the rear cover and the exciting coil mounted to the front cover mounted inner stator.

2. A brushless generator as claimed in claim 1, further including an external fan mounted to a portion of said rotor spindle extending externally of said front cover.

3. A brushless generator as claimed in claim 1, further including third conductor means for electrically coupling another terminal of said exciting coil to said inner stator.

4. A brushless generator as claimed in claim 1, wherein said insulated mounting elements comprise electrically conductive mounting bolts in electrical contact with said designation strip and insulating means for fixing and electrically isolating said conductive mounting bolts to said front and rear covers, respectively, said first and second electrical conductor means being in electrical contact with a respective one of said conductive mounting bolts.

* * * * *